July 31, 1956           J. BELLUGUE          2,757,335
DEVICES FOR DETECTING AND MEASURING MAGNETIC FIELDS
Filed March 4, 1952                          4 Sheets-Sheet 1

INVENTOR
JACQUES BELLUGUE
By:
Hazeltine, Lake & Co.
AGENTS

July 31, 1956  J. BELLUGUE  2,757,335
DEVICES FOR DETECTING AND MEASURING MAGNETIC FIELDS
Filed March 4, 1952 4 Sheets-Sheet 2
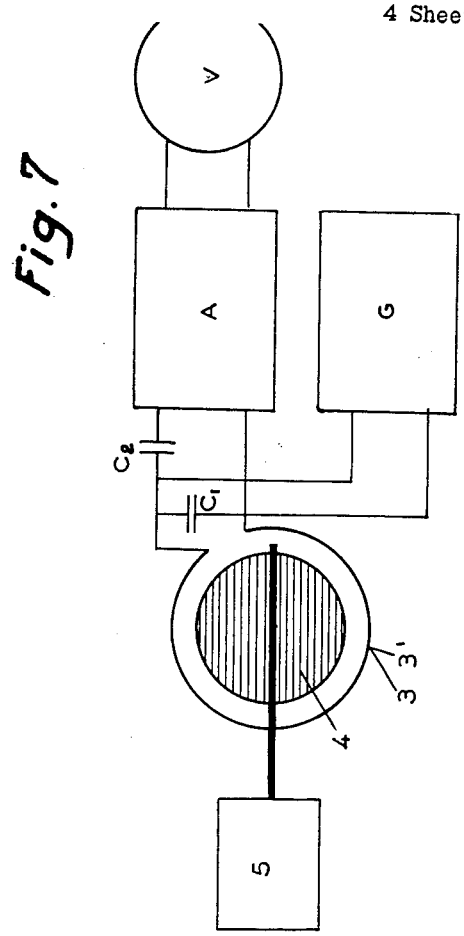
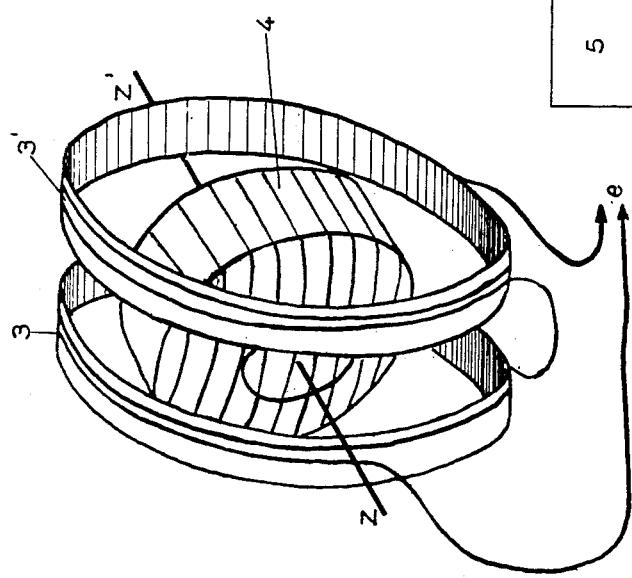
INVENTOR
JACQUES BELLUGUE
By:
Hazeltine, Lake & Co.
AGENTS July 31, 1956     J. BELLUGUE     2,757,335
DEVICES FOR DETECTING AND MEASURING MAGNETIC FIELDS
Filed March 4, 1952     4 Sheets-Sheet 4

INVENTOR
JACQUES BELLUGUE
By:
Hauttin, Lake & Co.
AGENTS

United States Patent Office 2,757,335
Patented July 31, 1956

2,757,335

DEVICES FOR DETECTING AND MEASURING MAGNETIC FIELDS

Jacques Bellugue, Paris, France, assignor to Compagnie Generale de Telegraphie Sans Fil, a corporation of France Application March 4, 1952, Serial No. 274,787

Claims priority, application France March 7, 1951

6 Claims. (Cl. 324—47)

The present invention relates to a device for measuring the magnitude and detecting the direction of D. C. and low frequency A. C. magnetic fields.

It is known that such measurements can be effected by making a coil rotate in the magnetic field to be measured, and by measuring across the terminals of this coil the alternating electro-motive force induced therein.

However, this method has several limitations, namely difficulty in obtaining a very small coil having a great number of turns, difficulty in making a coil which retains its shape while rotating very rapidly, difficulty inherent to measuring very small electro-motive forces, etc.

The object of the invention is an improved detecting or measuring device having none of the above mentioned limitations.

Figure 2:
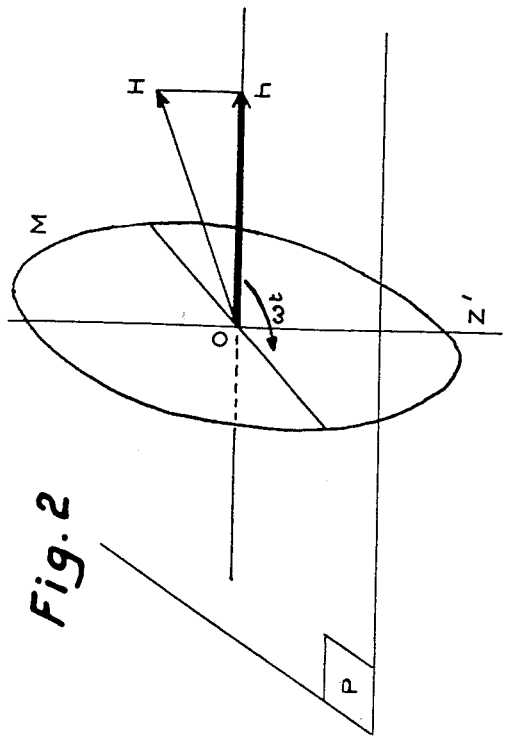
Figure 3:
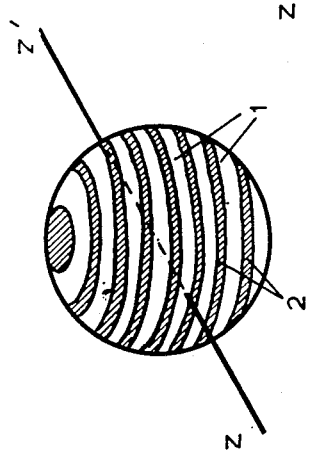
Figure 1:
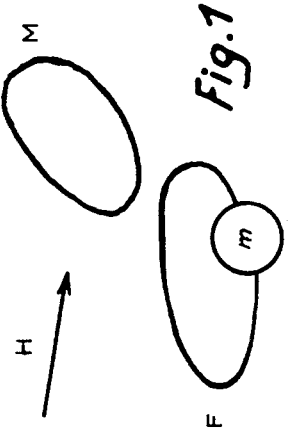
Figure 6:
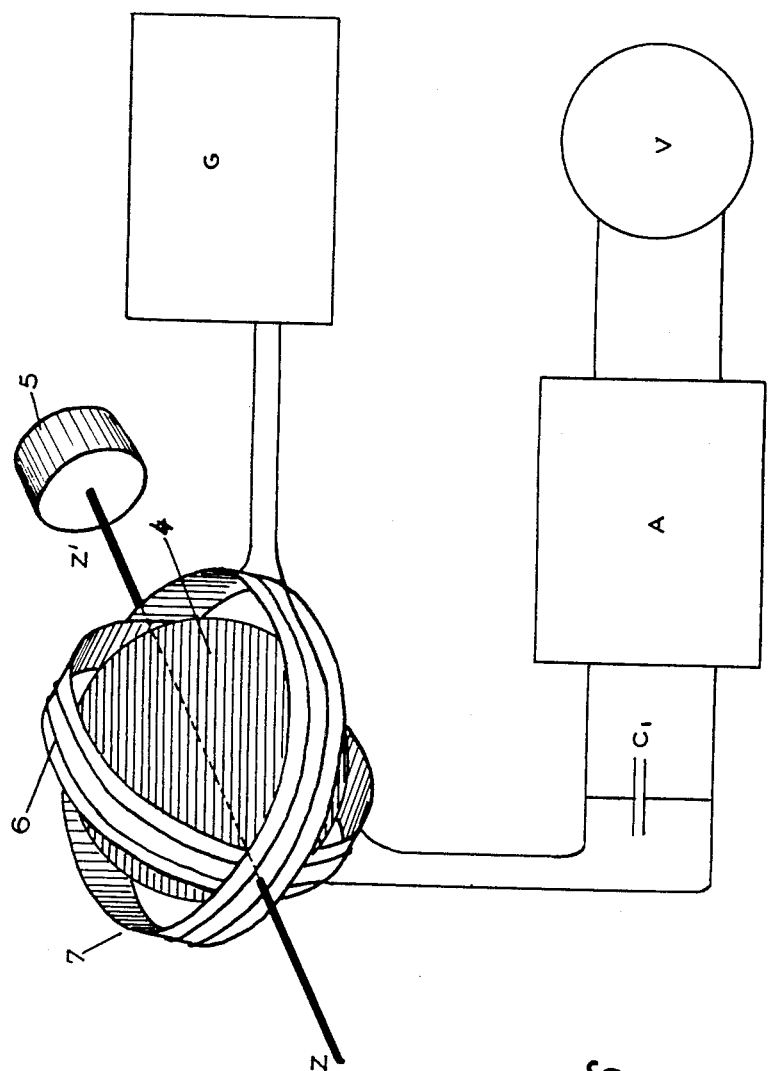
Figure 8:
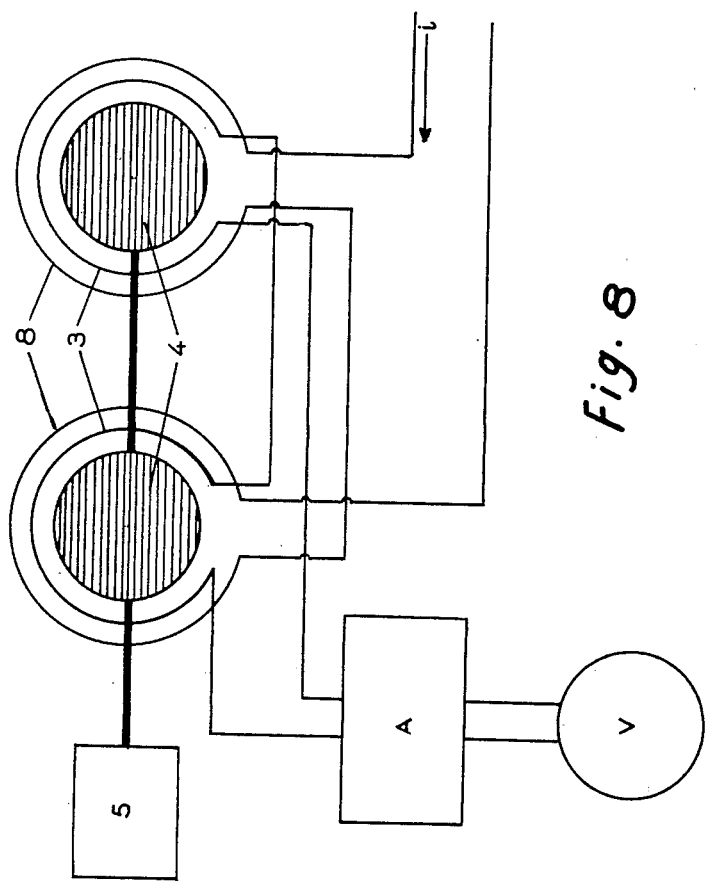

The invention will be better understood from the following description and the appended drawings wherein Figs. 1 and 2 explain the principle of the invention; Figs. 3, 4 and 5 show by way of nonlimitative examples, some embodiment of the rotor and stator of a measuring device according to the invention; and Figs. 6, 7 and 8 show diagrammatically and also by way of nonlimitative examples, some applications of the device according to the invention.

Fig. 1, shows a closed circuit M, which is rotatable in a uniform magnetic field H. An electro-motive force is generated in the turn M by the variation of the flux through this turn caused by the rotation of the turn M. The current which is caused to flow in the turn M generates a self-induction flux opposing the variations of the flux due to the turn rotation. A fixed circuit F placed in the vicinity of the circuit M and comprising a measuring device $m$ (voltmeter, amperemeter, oscillograph, etc.) will be crossed by a portion of the self-induction flux through M. The electro-motive force which is induced in the circuit F by this flux is measured by the measuring device $m$. This electro-motive force is proportional to the field H. Accordingly, the device $m$ provides a measure of H.

It should be pointed out that there is no electrical connection between the turn M and any fixed point.

Fig. 2 shows a closed circuit M assumed to rotate at a uniform angular velocity $\omega$ about its vertical axis ZZ'; calling $h$, the projection on a plane P, perpendicular to ZZ', of the magnetic field H, S the surface encircled by the turn M, $r$ its resistance and L its inductance, it may be shown that, as a consequence of the rotation of the circuit M, there is produced a field, proportional to H, which is fixed and another field, which rotates at angular speed $2\omega$. This latter field induces an electro-motive force of pulsation $2\omega$ and of an amplitude proportional to H, in any fixed circuit magnetically coupled to said movable circuit.

The sensivity of device depends upon the ratio $L/r$. Moreover, it may be shown that a coil including a great number of turns is equivalent in this respect to a single turn having same section, the structure of the rotor being thus simplified.

Figure 4B:
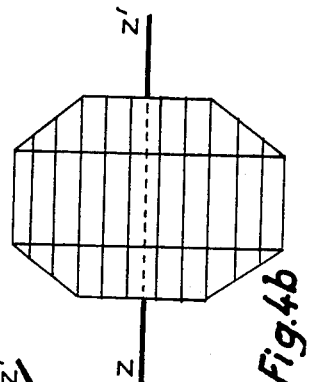
Figure 4A:
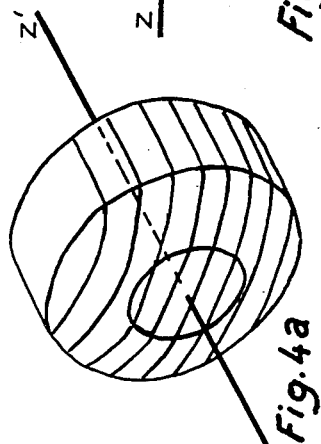

Accordingly, the rotor of the device according to the invention is of spherical (Figure 3) or substantially spherical form (Figure 4), and is constituted by a stack of metal plates 1 parallel to its rotation axis and separated from each other by insulating plates or sheets 2. The Figure 4b shows a side view of the rotor shown in perspective on the Figure 4a.

It may be shown that aluminum should be preferably used for the plates 1, as the smallest ratio $r/\omega_1$ is achieved in this way i. e. the relative ratio $L/R$ or quality factor and velocity $\omega$, for given mechanical conditions, are maximum.

The best stator will be such as to be able periodically to encircle the greatest possible part of self induction flux from the rotor. Otherwise stated, the coupling between roto and stator should be as close as possible. Moreover, the stator impedance should be matched to the measuring device $m$. For instance, the stator may be constituted by two coils 3 and 3' (Fig. 5).

The device according to the invention may be used for instance in the following way:

An alternating electro-motive force of pulsation $2\omega$ and whose amplitude is proportional to the field H to be measured and is a function of $\omega$, is provided across the terminals of the stator F.

The rotor M is preferably rotated at a fixed speed $\omega$. The stator may be tuned to the frequency $2\omega/2\pi$ to increase the sensitivity of the stator and the tuned stator is connected to a tuned amplifier, to filter the background noise.

To eliminate $\omega$ from the measurement of H, the rotor may be driven by a motor the speed of which is regulated, or the output voltage of the amplifier may be made independent from $\omega$ by giving the amplifier a response curve proper to that end, or again, a zero method may be employed as shown hereinafter with reference to the measurement of weak uniform fields.

A few examples will be mentioned further on:

1. Measurement of direct and alternating industrial fields.

The device is particularly suitable to be used as a probe as it is easy to make a very small rotor to measure the field at any given point.

The magnitude measured is the projection of the field vector on the rotor equatorial plane. If the rotor M is so directed that the field measured is zero, the rotor, axis ZZ' indicates exactly the field direction.

If the apparatus is dipped in an alternating field of some tens of cycles, it may be shown that the electromotive force provided across the stator terminals is greater than that which would be induced by the alternating flux in a fixed circuit, provided that the rotor rotation speed be great with regard to the alternating field pulsation.

2. Measurement with great accuracy, of weak uniform fields.

The circuit diagram utilized in this case is shown in Figure 6. It is essentially constituted by a motor 5 driving a rotor 4 which may for example be of the type shown in Figure 4. The stator comprises:

A measuring circuit 6 tuned by means of a condenser $C_1$ and connected to an amplifier A feeding a measuring device V (voltmeter, oscillograph, etc.); and a second circuit 7 which preferably is located in a plane perpendicular to circuit 6. This circuit is fed by a generator G, having a great internal resistance.

The stator may be rotated about the rotor axis ZZ'.
The measurement will be effected in the following way:
The generator being cut off, the field direction is first determined as described above.

The circuit 7 is then placed perpendicularly to the direction found, and a D. C. current is fed to the circuit 7 to cancel in the rotor the field to be measured. If the amplifier does not pass harmonics the current value which cancels the voltmeter reading measures the field. It should be pointed out that the rotor may be considered as a gyrostatic compass.

An interesting modification of the arrangement of Figure 6 is shown in Figure 7 wherein the same circuit is simultaneously used as measuring circuit and as the circuit 7. $C_1$ is the tuning condenser, $C_2$ is a link condenser. The generator impedance must be great with respect to the rotor impedance.

It is well understood that the rotor may be rotated by any known device. A pneumatic motor is preferred to avoid the presence of magnetic masses near the measuring device of the invention.

Fig. 8 shows a modulator comprising two devices according to the invention. The two rotors 4 of these devices are coaxially mounted and rotated by the same motor 5. Two identical stators 3 are provided around the rotors 4; these stators are in the same plane, coiled in opposite directions, and connected in series to an amplifier A, the output circuit of which is connected to a utilization device V. Two other stators 8 are also provided around rotors 4; the stators 8 are also in the same plane, coiled in opposite directions, and connected in series. A modulating current $i$ is fed to the stators 8, and a modulated current is obtained at the output of the amplifier A.

In the device of Fig. 8, the current $i$ circulating in stators 8 creates two magnetic fields of opposite directions; and these opposite fields produce, in the rotating rotors 4, currents which, in turn, induce in stators 3, voltages which add in the input circuit of the amplifier A, whereas, any exterior uniform magnetic field, the earth field more particularly, produces in stators 3 equal and opposite voltages balancing each other.

What I claim is:

1. A device for measuring a magnetic field comprising, in combination, a short-circuited rotor having substantially the shape of a body of revolution around its rotation axis, the rotor being constituted by metallic plates electrically insulated from one another and disposed parallel to said axis, motor means for imparting to said rotor a rotation movement around said axis, and static means comprising a collector coil magnetically coupled to said rotor.

2. A device for measuring a magnetic field comprising, in combination, a short-circuited rotor having substantially the shape of a body of revolution around its rotation axis, the rotor being constituted by metallic plates electrically insulated from one another and disposed parallel to said axis, motor means for imparting to said rotor a rotation movement around said axis, and static means comprising a collector coil magnetically coupled to said rotor, and an alternating current measuring device connected to said coil.

3. A device for measuring a magnetic field comprising, in combination, a short-circuited rotor presenting substantially the shape of a body of revolution around its rotation axis, the rotor being constituted by metallic plates electrically insulated from one another and disposed parallel to said axis, motor means imparting to said rotor a rotation movement around said axis, and static means comprising a collector coil magnetically coupled to said rotor, the axis of said coil being disposed perpendicularly to the said rotation axis, and an alternating current measuring device connected to said coil.

4. A magnetic field detecting device comprising, in combination, a short-circuited rotor having substantially the shape of a body of revolution around its axis, the rotor including a plurality of short-circuited conducting zones electrically insulated from one another and disposed parallel to said axis, motor means for imparting to said rotor a rotation movement around said axis, and static means including a collector coil magnetically coupled to said rotor.

5. The device of claim 4, in which the rotor is substantially spherical.

6. The device of claim 4, in which the conducting zones are made of aluminum.

References Cited in the file of this patent

UNITED STATES PATENTS

| | | |
|---|---|---|
| 2,049,232 | Sydnes | July 28, 1936 |
| 2,139,882 | Frobose | Sept. 20, 1938 |
| 2,451,819 | Frosch | Oct. 19, 1948 |

FOREIGN PATENTS

| | | |
|---|---|---|
| 544,676 | Great Britain | Apr. 23, 1942 |